Patented Dec. 30, 1924.

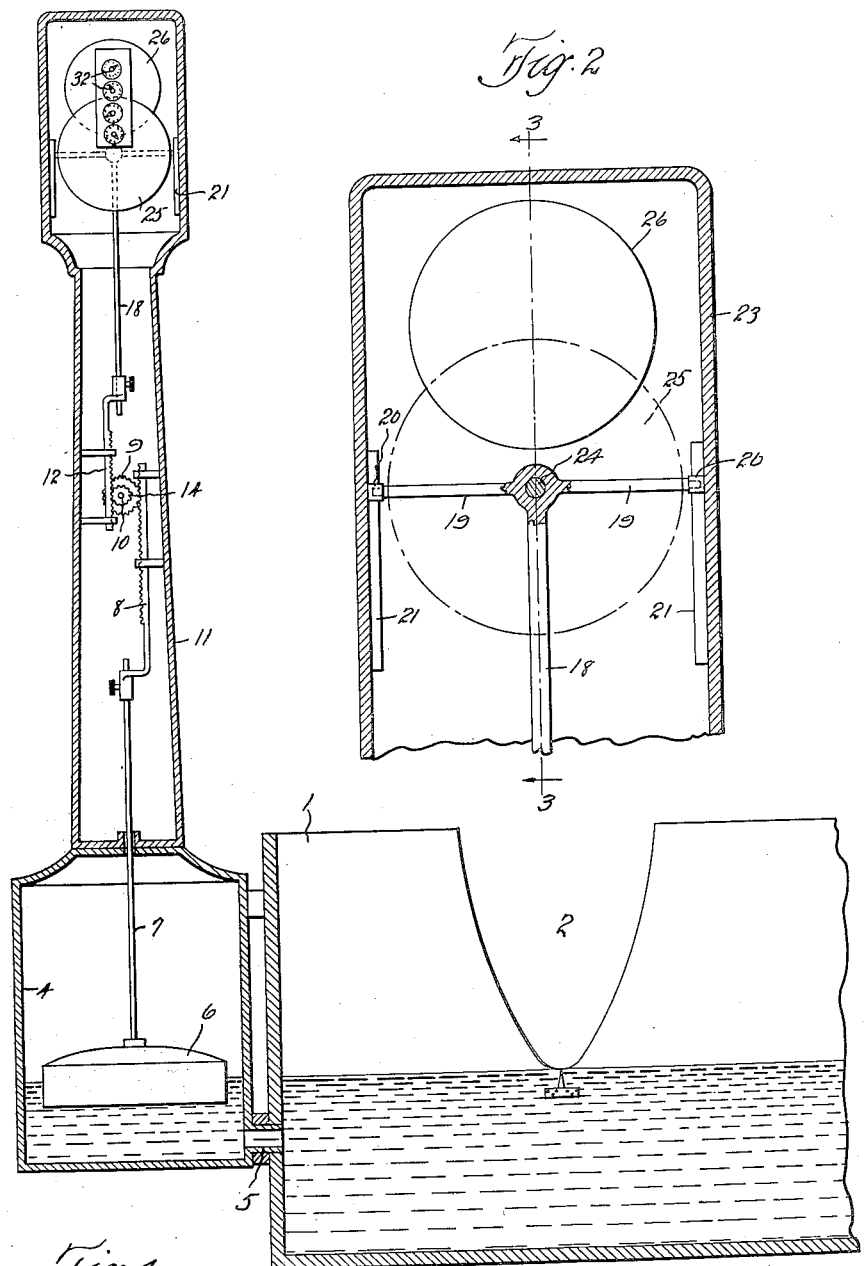

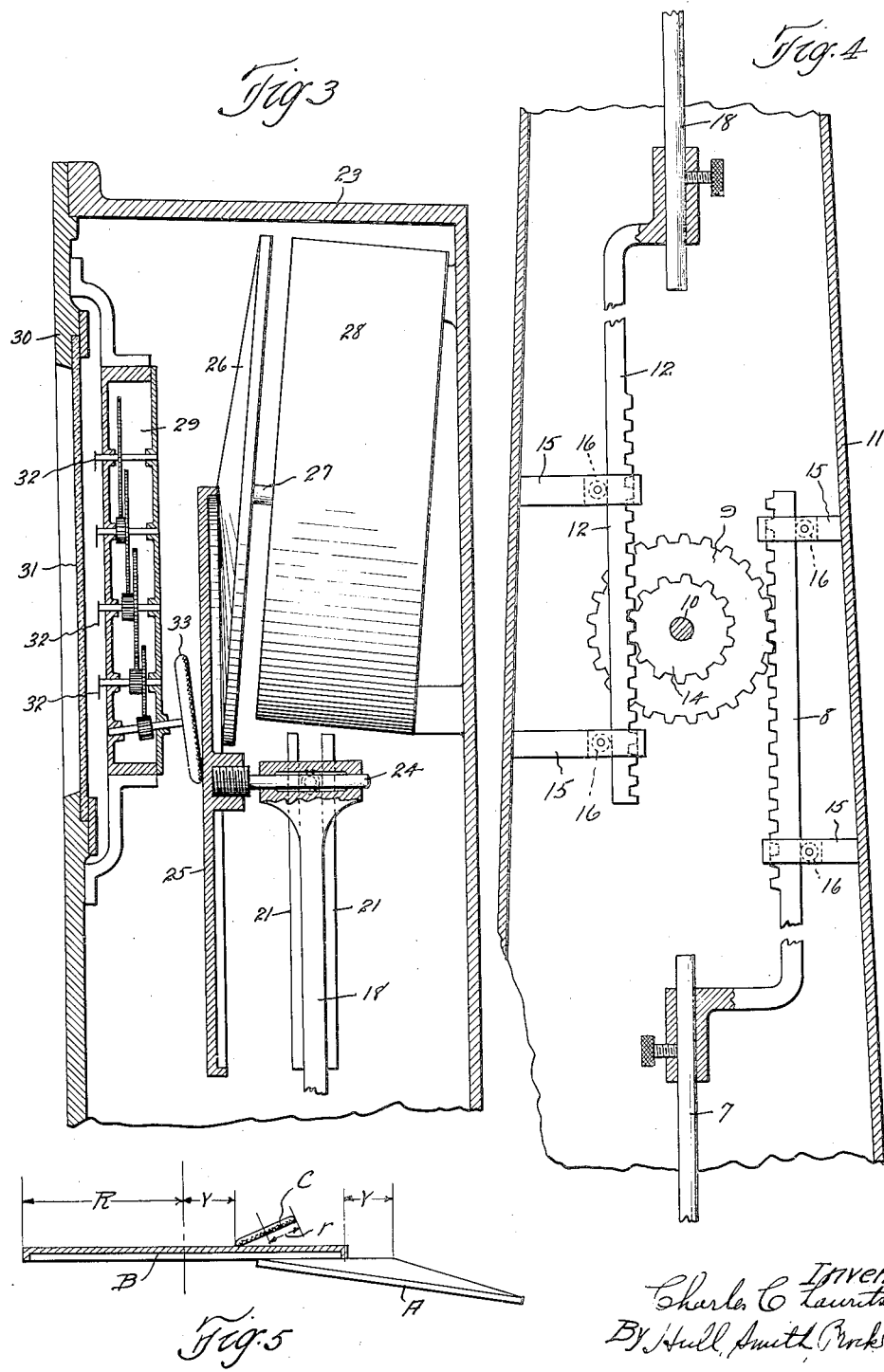

1,520,873

UNITED STATES PATENT OFFICE.

CHARLES C. LAURITSEN, OF CLEVELAND, OHIO, ASSIGNOR, BY MESNE ASSIGNMENTS, TO THE SWARTWOUT COMPANY, OF CLEVELAND, OHIO, A CORPORATION OF OHIO.

MEASURING AND INTEGRATING MECHANISM.

Application filed December 20, 1920. Serial No. 432,080.

*To all whom it may concern:*

Be it known that I, CHARLES C. LAURITSEN, a subject of the King of Denmark, residing at Cleveland, in the county of Cuyahoga and State of Ohio, have invented a certain new and useful Improvement in Measuring and Integrating Mechanism, of which the following is a full, clear, and exact description, reference being had to the accompanying drawings.

This invention relates to a measuring and integrating mechanism and has particular reference to a mechanism similar to that disclosed in my copending application Ser. No. 435,314, filed January 6, 1921.

In the aforesaid application a mechanism was described for measuring, and recording graphically and indicating numerically, a quantity which varies as the square of a variable, as for example, the flow of a liquid through a parabolic weir similar to that disclosed in my copending application Serial No. 359,933, filed February 19, 1920.

Some of the objects of the present invention are to provide a measuring and integrating mechanism which shall be capable of measuring a quantity which varies as the square of a variable, to provide a mechanism of the aforesaid character which shall be particularly adapted for measuring and indicating instantaneously the total flow of a liquid through a parabolic weir similar to that disclosed in the aforementioned application; to provide a mechanism which shall be simple in construction, accurate in operation and contain few parts which are simple and inexpensive to manufacture, while further objects and advantages will appear as the description proceeds.

In the accompanying drawings, Fig. 1 is a sectional view through the casing enclosing my invention which is shown as applied to a parabolic weir; Fig. 2 is an enlarged detail sectional view of the indicating head thereof; Fig. 3 is a sectional view taken on the line 3—3 of Fig. 2; Fig. 4 is an enlarged detail sectional view through that portion of the housing which encloses the reduction gearing interposed between the indicating head and the float member, and Fig. 5 is a diagrammatic illustration of the mathematical principle underlying my invention.

Describing by reference characters, the various parts illustrated, 1 indicates a suitable container which is provided with a parabolic weir notch 2 through which liquid from the container is adapted to flow. In my copending application Serial No. 359,983 above referred to I show that the quantity of liquid flowing therethrough varies as the square of the height of said liquid above zero level.

The mechanism for measuring and indicating numerically the quantity of liquid which has passed through the notch 2, comprises a float chamber 4, which is connected to the container 1 at a point below zero level of the weir notch, by a pipe 5. A float 6 having a vertical rod 7 extending upwardly therefrom, is positioned in the chamber 4 and rises and falls with the height of the liquid passing through the notch 2. The upper end of rod 7 has adjustably fastened thereto, a vertical rack 8 which meshes with a gear 9 fastened to a shaft 10 journaled in the tower 11 which rises from the float chamber 4. A second rack 12 meshes with a smaller gear 14 which is also fastened to the shaft 10. The racks 8 and 12 are each journaled in a pair of brackets 15—15 extending from the side of the tower 11 and each bracket is provided with a guide roller 16 to assist said racks in their vertical movement.

The upper end of rack 12 is adjustably connected to the vertical portion of a T rod 18 the upper end of which is provided with the lateral extensions 19—19. The outer end of each extension 19 is fitted with a roller 20 which is engaged in the channel (Figs. 2 and 3) formed by the guide bars 21—21 projecting from the opposite inner walls of the indicating head casing 23. Journaled in the head portion of the T member 18 is a shaft 24 which mounts at its outer end an idler disk 25, said disk being provided with a projecting edge which contacts at varying radii with a conical drive disk 26 which is fastened to the drive shaft 27 of a suitable clock work 28 mounted on the rear wall of the casing 23. A suitable counting mechanism 29 is shown fastened to the cover plate 30 (Fig. 3) which is provided with a window 31 so that the indicating dials 32 may be conveniently read. The lower end of the counting mechanism is provided with an angularly disposed driven wheel 33 which contacts with the center of the idler disk 25 at the same time that the idler disk contacts with the center of the conical driving disk 26.

In operation the float member 6 will rise and fall with the level of liquid in the float chamber 4 which in turn rises and falls with the level of the liquid in the container 1, hence the float 6 rises and falls directly as the height of the liquid above zero level flowing through the weir notch 2. The vertical movement of float 6 is transmitted by the rod 7 and rack 8 to the gear 9 which is rotated thereby. The small gear 14 being fastened to the same shaft is likewise rotated and causes the rack 12 and rod 18 and associated parts to be moved in a direction opposite to that of float 6. The relation between the diameters and number of teeth of gears 9 and 14 is preferably suited to the size of the weir notch 2. That is, the quantity of liquid flowing through the notch is in reality some constant (dependent principally upon the size of the notch) times the square of the height of the liquid above zero level and the gears 9 and 14 bear such a relation to this constant as to either eliminate it or increase it to any desired quantity. At zero level the outer edge of the idler disk 25 will contact with the center of the conical drive disk 26 and the driven wheel 33 will contact with the center of the idler disk, thus when the float 6 rises the idler disk will be moved downwardly a proportionate distance and the driven wheel 33 will be disposed at a radius on the idler disk equal to the radius at which the idler disk is disposed on the conical disk. These radii will be equal for each position of the float 6 and it will be found that the wheel 33 is driven at a speed which varies as the square of the displacement of the idler disk.

The mathematical theory underlying the principle of the aforesaid mechanism is illustrated in Fig. 5 wherein the conical disk is designated by A, the idler disk by B and the driven wheel by C.

If we assume that the height of liquid flowing through the notch 2 is such as to actuate the float 6 and associated parts in such manner as to dispose the idler disk B at a radius $y$ from the center of the disk A, then the wheel C will be disposed at an equal radius $y$ from the center of the disk B. For one revolution of the conical disk A then a point on the circumference of the idler disk B will travel a distance equal to a circumference on disk A at a radius $y$ which is measured by the expression $2\pi y$.

If the idler disk B has a fixed radius R then its circumference will be measured by the expression $2\pi R$.

Then for each revolution of disk A, disk B will make $$\frac{2\pi y}{2\pi R} \text{ or } \frac{y}{R} \text{ revolutions.}$$

If the driven wheel C has a fixed radius $r$ then for each revolution of disk B, the wheel C will make $$\frac{2\pi y}{2\pi r} \text{ or } \frac{y}{r} \text{ revolutions.}$$

Hence for one revolution of disk A, the wheel C will make $$\frac{y}{R} \times \frac{y}{r} = \frac{y^2}{Rr} \text{ revolutions.}$$

Since R and $r$ are constant quantities it is evident that the wheel C will be driven at a speed which varies as $y^2$ or as the square of a variable. Hence the indicating dials will register a quantity which varies as the square of a variable which quantity may be the quantity of liquid flowing through a parabolic weir or any other quantity which varies in this relation.

Having thus described my invention, what I claim is:

1. A mechanism of the character described comprising a disk adapted to rotate at a constant speed, an indicating mechanism having a driving wheel in operative connection therewith, a second disk interposed between said constant speed disk and said driving wheel, said parts being so arranged that said driving wheel will contact with the center of said interposed disk at the same time that the outer edge of said interposed disk contacts with the center of said constant speed disk, and means for moving said interposed disk to cause said constant speed disk to drive said wheel at a speed which varies as the square of a variable.

2. A mechanism of the character described comprising a disk adapted to rotate at a constant speed, an indicating mechanism having a driving wheel in operative connection therewith, a second disk operatively connected to said first disk and said driving wheel, and means for moving said second disk in such manner that said driving wheel will be disposed at a radius equal to the radius at which said disk is disposed on said first disk.

3. The combination with a chamber having a weir notch therein of such shape that the quantity of liquid flowing therethrough varies in direct proportion to the square of the height of liquid passing therethrough, of a float arranged to rise and fall in accordance with the liquid level in said chamber, an indicating mechanism, and power transmitting mechanism operatively connecting said float and indicating mechanism, said power transmitting mechanism including a disk operatively connected to said indicating mechanism and movable to variable radii on a second disk rotating at a constant speed thereby to drive said indicating mechanism at a rate in direct proportion to the square of the vertical distance said float moves.

4. The combination with a chamber having a weir notch therein of such shape that the quantity of liquid flowing therethrough varies in direct proportion to the square of the height of liquid passing therethrough, of a float arranged to rise and fall in accordance with the liquid level in said chamber, an indicating mechanism having a drive wheel, a disk adapted to rotate at a constant speed, a second disk interposed between said first disk and drive wheel and operatively connected therewith, and a connection between said float and said second disk, said first disk and drive wheel being disposed at directly proportional radii on said second disk whereby said first disk will drive said indicating mechanism at a rate directly proportional to the square of the distance moved by said float.

5. A mechanism for registering a quantity which varies as the square of a variable comprising a rotary member adapted to rotate at a constant speed, an indicating mechanism having a circular drive wheel, a rotatable element in contact with said rotary member and said drive wheel, and means for moving said rotatable element to vary in direct proportion the radii of contact of said rotary member and drive wheel therewith, thereby to drive said wheel at a speed which varies as the square of a variable.

6. A mechanism for registering a quantity which varies as the square of a variable comprising a disk adapted to rotate at a constant speed, an indicating mechanism, and a second disk operatively connecting said constant speed disk and mechanism, said second disk being movable to variable radii along said constant speed disk thereby to vary the speed of drive from said constant speed disk to said mechanism in accordance with a quantity which varies as the square of a variable.

7. A mechanism for registering a quantity which varies as the square of a variable comprising a rotary member adapted to rotate at a constant speed, an indicating mechanism having a circular drive wheel, a disk connecting said rotary member with said drive wheel, and means for moving said disk in accordance with the quantity to be measured, said rotary member and drive wheel being connected at directly proportional radii for variable positions of said disk with respect to said drive wheel and rotary member.

In testimony whereof, I hereunto affix my signature.

CHARLES C. LAURITSEN.